US012603318B2

(12) United States Patent
Zhang et al.

(10) Patent No.: US 12,603,318 B2
(45) Date of Patent: Apr. 14, 2026

(54) DISTRIBUTED LARGE-SCALE SYSTEM OF ALL-VANADIUM REDOX FLOW BATTERY

(71) Applicant: VRB Energy Inc., Grand Cayman (KY)

(72) Inventors: Hongliang Zhang, Beijing (CN); Mianyan Huang, Beijing (CN); Jian Wang, Beijing (CN)

(73) Assignee: VRB Energy Inc., Grand Cayman (KY)

( * ) Notice: Subject to any disclaimer, the term of this patent is extended or adjusted under 35 U.S.C. 154(b) by 694 days.

(21) Appl. No.: 18/051,479

(22) Filed: Oct. 31, 2022

(65) Prior Publication Data

US 2023/0138926 A1 May 4, 2023

(30) Foreign Application Priority Data

Nov. 2, 2021 (CN) .......................... 202111288951.X

(51) Int. Cl.
H01M 8/18 (2006.01)
H01M 10/04 (2006.01)
H01M 4/02 (2006.01)

(52) U.S. Cl.
CPC ....... H01M 8/188 (2013.01); H01M 10/0445 (2013.01); *H01M 2004/027* (2013.01); *H01M 2004/028* (2013.01)

(58) Field of Classification Search
CPC .......................... H01M 8/188; H01M 10/0445
See application file for complete search history.

(56) References Cited

U.S. PATENT DOCUMENTS 3,279,949 A 10/1966 Schaefer et al.
3,530,003 A 9/1970 Warszawski et al.
(Continued)

FOREIGN PATENT DOCUMENTS

AT 509888 A4 12/2011
AU 5556286 A 8/1987
(Continued)

OTHER PUBLICATIONS

"Flow Battery," Flow Battery Solutions, Mar. 15, 2013, 4 pages. <http://www.arbin.com/products/flow-battery?gclid= CKvNqLXD7bUCFed1Ogod-jcAkQ>.
(Continued)

*Primary Examiner* — Olatunji A Godo
(74) *Attorney, Agent, or Firm* — Dorsey & Whitney LLP

(57) ABSTRACT

The application relates to a distributed large-scale system of an all-vanadium redox flow battery, comprising a main electrical energy storage center, power distribution subsystems and a control subsystem. If the power of the power distribution subsystem does not meet a preset power requirement and/or the distance between the power distribution subsystem and the main electrical energy storage center exceeds a preset distance, a sub electric energy storage center connected with the main electrical energy storage center is arranged in the power distribution subsystem. The power distribution subsystem comprises an electric energy load point and/or an electric energy access point. The main electrical energy storage center and the plurality of power distribution subsystems are electrically connected with the control subsystem respectively. The power supply system has the effect of meeting the power increase and decrease requirements of a plurality of distributed external loads or power supply systems.

9 Claims, 2 Drawing Sheets

(56) References Cited

U.S. PATENT DOCUMENTS

| | | | |
|---|---|---|---|
| 3,666,561 A | 5/1972 | Chiku |
| 3,996,064 A | 12/1976 | Thaller |
| 4,018,508 A | 4/1977 | Mcdermott et al. |
| 4,181,777 A | 1/1980 | Nidola et al. |
| 4,287,465 A | 9/1981 | Godard et al. |
| 4,312,735 A | 1/1982 | Grimes et al. |
| 4,362,791 A | 12/1982 | Kaneko et al. |
| 4,371,433 A | 2/1983 | Balko et al. |
| 4,410,606 A | 10/1983 | Loutfy et al. |
| 4,786,567 A | 11/1988 | Skyllas-Kazacos et al. |
| 4,797,566 A | 1/1989 | Nozaki et al. |
| 4,908,281 A | 3/1990 | O'Callaghan |
| 4,927,509 A | 5/1990 | Mathur et al. |
| 4,956,244 A | 9/1990 | Shimizu et al. |
| 5,225,712 A | 7/1993 | Erdman |
| 5,250,158 A | 10/1993 | Kaneko et al. |
| 5,308,718 A | 5/1994 | Eidler et al. |
| 5,318,865 A | 6/1994 | Kaneko et al. |
| 5,368,762 A | 11/1994 | Sato et al. |
| 5,484,666 A | 1/1996 | Gibb et al. |
| 5,486,430 A | 1/1996 | Gorbell et al. |
| 5,512,787 A | 4/1996 | Dederick |
| 5,587,132 A | 12/1996 | Nakajima et al. |
| 5,601,943 A | 2/1997 | Eidler et al. |
| 5,656,390 A | 8/1997 | Kageyama et al. |
| 5,665,212 A | 9/1997 | Zhong et al. |
| 5,725,967 A | 3/1998 | Mark |
| 5,734,255 A | 3/1998 | Thompson et al. |
| 5,759,711 A | 6/1998 | Miyabayashi et al. |
| 5,851,694 A | 12/1998 | Miyabayashi et al. |
| 6,086,643 A | 7/2000 | Duncan et al. |
| 6,143,443 A | 11/2000 | Kazacos et al. |
| 6,219,623 B1 | 4/2001 | Wills |
| 6,239,508 B1 | 5/2001 | Faris et al. |
| 6,242,125 B1 | 6/2001 | Eidler et al. |
| 6,261,714 B1 | 7/2001 | Eidler et al. |
| 6,414,653 B1 | 7/2002 | Kobayashi |
| 6,416,653 B1 | 7/2002 | Barben et al. |
| 6,461,772 B1 | 10/2002 | Miyake et al. |
| 6,468,688 B2 | 10/2002 | Kazacos et al. |
| 6,475,661 B1 | 11/2002 | Pellegri et al. |
| 6,519,041 B1 | 2/2003 | Berthold |
| 6,524,452 B1 | 2/2003 | Clark et al. |
| 6,544,679 B1 | 4/2003 | Petillo et al. |
| 6,555,267 B1 | 4/2003 | Broman et al. |
| 6,558,833 B2 | 5/2003 | Mccoy |
| 6,562,514 B1 | 5/2003 | Kazacos et al. |
| 6,563,234 B2 | 5/2003 | Hasegawa et al. |
| 6,609,081 B1 | 8/2003 | De et al. |
| 6,613,298 B2 | 9/2003 | Tanaka et al. |
| 6,670,721 B2 | 12/2003 | Lof et al. |
| 6,680,547 B1 | 1/2004 | Dailey |
| 6,761,945 B1 | 7/2004 | Adachi et al. |
| 6,764,789 B1 | 7/2004 | Sekiguchi et al. |
| 6,809,431 B1 | 10/2004 | Schippmann |
| 6,858,953 B2 | 2/2005 | Stahlkopf |
| 6,875,535 B2 | 4/2005 | Ye et al. |
| 6,916,579 B2 | 7/2005 | Gorchkov et al. |
| 7,052,796 B2 | 5/2006 | Sabin et al. |
| 7,061,205 B2 | 6/2006 | Shigematsu et al. |
| 7,078,123 B2 | 7/2006 | Kazacos et al. |
| 7,083,875 B2 | 8/2006 | Lillis et al. |
| 7,181,183 B1 | 2/2007 | Hennessy |
| 7,184,903 B1 | 2/2007 | Williams et al. |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 7,258,947 B2 | 8/2007 | Kubata et al. |
| 7,265,456 B2 | 9/2007 | Hennessy |
| 7,353,083 B2 | 4/2008 | Hennessy |
| 7,361,427 B1 | 4/2008 | Dow et al. |
| 7,389,189 B2 | 6/2008 | Williams et al. |
| 7,517,608 B2 | 4/2009 | Brereton et al. |
| 7,682,728 B2 | 3/2010 | Harper |
| 7,687,193 B2 | 3/2010 | Harper |
| 7,704,634 B2 | 4/2010 | Deguchi et al. |
| 7,740,977 B2 | 6/2010 | Lepp et al. |
| 8,026,013 B2 | 9/2011 | Valensa et al. |
| 8,048,555 B2 | 11/2011 | Darcy et al. |
| 8,277,964 B2 | 10/2012 | Hennessy |
| 8,541,138 B2 | 9/2013 | Kazacos et al. |
| 2001/0028977 A1 | 10/2001 | Kazacos et al. |
| 2003/0087156 A1 | 5/2003 | Broman et al. |
| 2003/0143456 A1 | 7/2003 | Kazacos et al. |
| 2004/0036360 A1 | 2/2004 | Mccombs |
| 2004/0044442 A1 | 3/2004 | Bayoumi et al. |
| 2004/0113431 A1 | 6/2004 | Huang |
| 2004/0121204 A1 | 6/2004 | Adelman et al. |
| 2004/0151953 A1 | 8/2004 | Kirk et al. |
| 2004/0158417 A1 | 8/2004 | Bonet |
| 2004/0169493 A1 | 9/2004 | Tsutsui et al. |
| 2004/0172943 A1 | 9/2004 | Buelow et al. |
| 2004/0191623 A1 | 9/2004 | Kubata et al. |
| 2004/0207207 A1 | 10/2004 | Stahlkopf |
| 2004/0241544 A1 | 12/2004 | Nakaishi et al. |
| 2005/0004716 A1 | 1/2005 | Lillis et al. |
| 2005/0012395 A1 | 1/2005 | Eckroad et al. |
| 2005/0074665 A1 | 4/2005 | Spaziante et al. |
| 2005/0077252 A1 | 4/2005 | Shih et al. |
| 2005/0147871 A1 | 7/2005 | Shigematsu et al. |
| 2005/0156431 A1 | 7/2005 | Hennessy |
| 2005/0156432 A1 | 7/2005 | Hennessy |
| 2005/0158614 A1 | 7/2005 | Hennessy |
| 2005/0158615 A1 | 7/2005 | Samuel et al. |
| 2006/0142899 A1 | 6/2006 | Wobben |
| 2006/0171086 A1 | 8/2006 | Hennessy et al. |
| 2006/0273595 A1 | 12/2006 | Avagliano et al. |
| 2007/0001461 A1 | 1/2007 | Hopewell |
| 2007/0035135 A1 | 2/2007 | Yoshida |
| 2007/0072067 A1 | 3/2007 | Symons et al. |
| 2007/0202385 A1 | 8/2007 | Minamiura et al. |
| 2007/0219755 A1 | 9/2007 | Williams et al. |
| 2007/0258784 A1 | 11/2007 | Looker |
| 2008/0081247 A1 | 4/2008 | Nakaishi et al. |
| 2008/0182157 A1 | 7/2008 | Msco et al. |
| 2008/0220318 A1 | 9/2008 | Brereton et al. |
| 2008/0241643 A1 | 10/2008 | Lepp et al. |
| 2009/0004536 A1 | 1/2009 | Knauer et al. |
| 2009/0047570 A1 | 2/2009 | Harper |
| 2009/0047571 A1 | 2/2009 | Harper |
| 2009/0311559 A1 | 12/2009 | Levine et al. |
| 2010/0003545 A1 | 1/2010 | Horne et al. |
| 2010/0003586 A1 | 1/2010 | Sahu |
| 2010/0021805 A1 | 1/2010 | Winter |
| 2010/0136455 A1 | 6/2010 | Winter |
| 2011/0074357 A1 | 3/2011 | Parakulam et al. |
| 2011/0115425 A1 | 5/2011 | Olsson |
| 2011/0136016 A1 | 6/2011 | Huang et al. |
| 2011/0215645 A1 | 9/2011 | Markus et al. |
| 2011/0300417 A1 | 12/2011 | Mou et al. |
| 2011/0311896 A1 | 12/2011 | Harper et al. |
| 2012/0164498 A1 | 6/2012 | Mncent et al. |
| 2012/0217933 A1 | 8/2012 | Abe et al. |
| 2012/0328911 A1 | 12/2012 | Hennessy |
| 2013/0089767 A1 | 4/2013 | Blacker et al. |
| 2013/0127396 A1 | 5/2013 | Triebel et al. |
| 2013/0154364 A1 | 6/2013 | Hennessy |
| 2013/0295487 A1 | 11/2013 | Huang et al. |
| 2018/0375132 A1* | 12/2018 | Li .................. H01M 8/188 |

FOREIGN PATENT DOCUMENTS

| | | |
|---|---|---|
| AU | 8586291 A | 4/1992 |
| CN | 206673709 U | 11/2017 |
| CN | 206758557 U | 12/2017 |
| CN | 206758558 U | 12/2017 |
| CN | 206758562 U | 12/2017 |
| CN | 206758563 U | 12/2017 |
| CN | 206878104 U | 1/2018 |
| CN | 207759257 U | 8/2018 |
| CN | 207765538 U | 8/2018 |
| CN | 207765547 U | 8/2018 |
| CN | 207765549 U | 8/2018 |
| CN | 207765551 U | 8/2018 |

(56) References Cited

FOREIGN PATENT DOCUMENTS

| | | | |
|---|---|---|---|
| CN | 207765552 U | 8/2018 | |
| CN | 207765752 U | 8/2018 | |
| CN | 207925586 U | 9/2018 | |
| CN | 109309241 A | 2/2019 | |
| CN | 110065698 A | 7/2019 | |
| CN | 110071303 A | 7/2019 | |
| CN | 110071305 A | 7/2019 | |
| CN | 110071310 A | 7/2019 | |
| CN | 110071314 A | 7/2019 | |
| CN | 110071319 A | 7/2019 | |
| CN | 110071404 A | 7/2019 | |
| CN | 110137554 A | 8/2019 | |
| CN | 110148955 A | 8/2019 | |
| CN | 110474067 A | 11/2019 | |
| CN | 110620240 A | 12/2019 | |
| CN | 110845849 A | 2/2020 | |
| CN | 110854401 A | 2/2020 | |
| CN | 210764128 U | 6/2020 | |
| CN | 211905519 U | 11/2020 | |
| CN | 112350388 A | 2/2021 | |
| EP | 0246649 A1 | 11/1987 | |
| EP | 0517217 A1 | 12/1992 | |
| EP | 0566019 A1 | 10/1993 | |
| EP | 0814527 A2 | 12/1997 | |
| EP | 0889571 A2 | 1/1999 | |
| EP | 0814527 B1 | 4/2002 | |
| EP | 1284513 A1 | 2/2003 | |
| EP | 1385226 A1 | 1/2004 | |
| EP | 1536506 A1 | 6/2005 | |
| FR | 2034755 A1 | 12/1970 | |
| GB | 2030349 A | 4/1980 | |
| GB | 2085475 A | 4/1982 | |
| JP | S54138502 A | 10/1979 | |
| JP | S5642970 A | 4/1981 | |
| JP | S579072 A | 1/1982 | |
| JP | S579073 A | 1/1982 | |
| JP | S60225366 A | 11/1985 | |
| JP | S6369151 A | 3/1988 | |
| JP | H0714617 A | 1/1995 | |
| JP | H087913 A | 1/1996 | |
| JP | H0819179 A | 1/1996 | |
| JP | H09283169 A | 10/1997 | |
| JP | H11299106 A | 10/1999 | |
| JP | 2003317763 A | 11/2003 | |
| JP | 2004319341 A | 11/2004 | |
| JP | 2007153477 A | 6/2007 | |
| JP | 2007192776 A | 8/2007 | |
| JP | 2009283169 A | 12/2009 | |
| WO | 8905363 A1 | 6/1989 | |
| WO | 8905528 A1 | 6/1989 | |
| WO | 9003666 A1 | 4/1990 | |
| WO | 9512219 A1 | 5/1995 | |
| WO | 9939397 A1 | 8/1999 | |
| WO | 9950945 A1 | 10/1999 | |
| WO | 03092109 A1 | 11/2003 | |
| WO | 2004054065 A1 | 6/2004 | |
| WO | 2006081514 A2 | 8/2006 | |
| WO | 2006089415 A1 | 8/2006 | |
| WO | 2006129635 A1 | 12/2006 | |
| WO | 2008053317 A1 | 5/2008 | |
| WO | 2010118060 A1 | 10/2010 | |
| WO | 2011074330 A1 | 6/2011 | |
| WO | 2011114094 A1 | 9/2011 | |
| WO | 2011154306 A2 | 12/2011 | |

OTHER PUBLICATIONS

6001 Chemical Abstract, 1989, No. 22, 111:198495s, printed Feb. 6, 2012, 2 pgs.

Bartolozzi, M., "Development of Redox Flow Batteries. A Historical Bibliography," Journal of Power Sources, 27 (1989), pp. 219-234.

Barton, John P. and Infield, David G.; "Energy Storage and Its Use with Intermittent Renewable Energy," IEEE Transactions on Energy Conversion, vol. 19, No. 2, Jun. 2004 (8 pgs.).

Chen et al., "Solution Redox Couples for Electrochemical Energy Storage," Journal of Electrochemical Society Energy Storage (128), downloaded Feb. 6, 2012, pp. 1460-1467.

Chen et al., "Solution Redox Couples for Electrochemical Energy Storage," Journal of Electrochemical Society Energy Storage (1982), 129(1), downloaded Feb. 6, 2012, pp. 61-66.

Close, Tullis; "Energy storage—a key technology for global energy sustainability," Journal of Power Sources 100, 2-17, 2001 (16 pgs.).

Definition of "Electrical Power" retrieved from Dictionary.com on Aug. 12, 10.

Definition of "Load" retrieved from Dictionary.com on Aug. 12, 10.

Hagedorn, Mark, et al., "NASA Redox Cell Stack Shunt Current, Pumping Power, and Cell Performance Tradeoffs," National Aeronautics and Space Administration, Lewis Research Center, Feb. 1982, 30 pages.

Hawkins, J.M. et al., "A field trial of a Vanadium Energy Storage System," INTELC 2001, Oct. 2001, pp. 652-656, Conference Publication No. 484.

Kazacos et al., "Vanadium redox cell electrolyte optimization studies," Journal of Applied Electrochemistry, 1990, 20, pp. 463-467.

Liu, Galasco, and Savinell, "Enhancing Performance of the Ti(III)/Ti(IV) Couple for Redox Battery Applications," Journal of Electrochemical Society, 1981, downloaded Feb. 6, 2012, pp. 1755-1757.

Murthy et al., "Fe(III)/Fe(II)—Ligand Systems for Use as Negative Half-Cells in Redox-Flow Cells," Journal of Power Sources, 1989, 27(2), pp. 119-126.

Nevins, Sheri et al., Article entitled "Flow Battery Solution for Smart Grid Renewable Energy Applications," Ktech Corporation, 2010 DOE Energy Storage Program Review, Nov. 10, 2010 (14 pgs.).

Nguyen, Trung and Savinell, Robert F.; "Flow Batteries", The Electrochemical Society Interface; Fall 2010 (3 pgs.).

Norris, Benjamin L.; Lex, Peter; Ball, Greg J.; and Scaini, Vince; "Grid-Connected Solar Energy Storage Using the Zinc-Bromine Flow Battery"; (4 pgs.).

Ponce De Leon, C.; Frias-Ferrer, A.; Gonzalez-Garcia, J.; Szanto, D.A.; and Walsh, F.C.; "Redox Flow Cells for Energy Conversion"; Elsevier B.V. ScienceDirect, Journal of Power Sources 160, 716-732; 2006, 17 pgs.

Premium Power Corporation, North Andover, Massachusetts, United States; Powerblock 150 Specifications (2 pgs.).

Premium Power Corporation, North Andover, Massachusetts, United States; Product Brochure, "Zinc-Flow 45 Regenerative fuel cell with DC output power, for uninterrupted operation of mission-critical site infrastructure"; (2 pgs.).

Premium Power Corporation, North Reading, Massachusetts, United States, Product Brochure, "TransFlow 2000, Utility-Scale Mobile Energy Storage System," http://www.premiumpower.com/product/TF2000_2-pager.pdf, 2 pgs.

Shigematsu, T.; Kumamoto T.; Deguchi, H.; and Hara, T.; "Applications of a Vanadium Redox-Flow Battery to Maintain Power Quality," Sumitomo Electric Industries, Ltd., IEEE 2002 (6 pgs.).

Skyllas-Kazacos et al., "Characteristics and performance of 1 kW UNSW vanadium redox battery," Journal of Power Sources, 35 (1991) pp. 399-404.

Skyllas-Kazacos et al., "Development of Redox Cell for Remote Area Energy Storage," School of Chemical Engineering & Industrial Chemistry, University of New South Wales, 200 pgs.

Skyllas-Kazacos et al., "Vanadium redox battery prototype: design & development," University of New South Wales, Department of Minerals and Energy, Jan. 1991, 256 pgs.

Sum, et al., "A Study of the V(II)/V(III) Redox Couple for Redox Flow Cell Applications," Journal of power Sources, 15 (1985), pp. 179-190.

ZBB Energy Corporation, Menomonee Falls, Wisconsin, United States, Product Brochure, "The Focus of Advanced Energy Storage Systems," http://www.zbbenergy.com/pdf/ZBB_CorpBrochure_Web.pd, 8 pgs.

(56)  References Cited

OTHER PUBLICATIONS

Kazacos, Michael, "Electrolyte Optimization and Electrode Material Evaluation for the Vanadium Redox Battery,", a thesis submitted as part of the requirements for the degree of Master of Science, School of Chemical Engineering and Industrial Chemistry, The University of New South Wales, Feb. 1989, 252 pgs.

Scamman, Daniel P.; Reade, Gavin W.; and Roberts, Edward P.L.;, "Numerical Modelling of a Bromide-Polysulphide Redox Flow Battery Part 1: Modelling Approach and Validation for a Pilot-Scale System"; Elsevier B.V. Journal of Power Sources 189, 1120-1230; 2009, 9 pgs.

Tokuda, Nobuyuki; Kanno, Takashi; Hara, Takushi; Shigematsu, Toshio; Tsutsui, Yasumitsu; Ikeuchi, Atsuo; Itou, Takefumi; and Kumamoto, Takahiro;, ; "Development of a Redox Flow Battery System"; SEI Technical Review, No. 50; Jun. 2000, 4 pgs.

* cited by examiner

DISTRIBUTED LARGE-SCALE SYSTEM OF ALL-VANADIUM REDOX FLOW BATTERY

RELATED APPLICATIONS

This application claims priority to and the benefit of Chinese Patent Application No. 202111288951.X filed on Nov. 2, 2021, the disclosure of which is expressly incorporated herein by reference in its entirety.

TECHNICAL FIELD

The application relates to the technical field of battery system manufacturing and application, in particular to a distributed large-scale system of an all-vanadium redox flow battery.

BACKGROUND

The vanadium redox flow battery is a redox battery with vanadium substances in a circulating flow liquid state, stores electric energy in sulfuric acid electrolyte of vanadium ions with different valence states in a chemical energy mode, and is a new-generation environment-friendly energy battery.

In the application process of the all-vanadium redox flow battery, the all-vanadium redox flow battery needs to supply power to a plurality of electric energy load points. When the all-vanadium redox flow battery is in a discharging state, an electric energy load point of the all-vanadium redox flow battery is electrically connected with an external load to provide required electric energy for the load; when the all-vanadium redox flow battery is in a charging state, the electric energy access point of the all-vanadium redox flow battery is electrically connected with the power supply system, so that the electric energy is stored.

In view of the above related technologies, the inventor thinks that when the all-vanadium redox flow battery needs to be connected to a plurality of external loads or power supply systems, situations may occur in which the power supply requirement is not met or the storage capacity is insufficient; in addition, when the external load and the power supply system are far away from the all-vanadium redox flow battery, the reaction rate of the electrolyte of the all-vanadium redox flow battery is affected, so that the power requirements of a plurality of distributed external loads or power supply systems cannot be met.

SUMMARY

In summary, the present application includes at least one of the following beneficial technical effects:

1. the main electrical energy storage center is connected with the power distribution subsystem through a pipeline, so that the traditional cable transportation electric energy can be converted into electrolyte transportation in the pipeline, the safety performance is improved, the power supply problem in an area and the high-power energy storage requirement are effectively relieved, when the all-vanadium redox flow battery is applied in a large scale, a redox flow DC power grid can be provided, the transmission power loss is reduced, the power support is rapidly carried out, and the secondary energy storage capacity can be set according to the power requirement of the power distribution subsystem;

2. in the process of charging and discharging of the all-vanadium redox flow battery, because some battery stacks do not participate in reaction and some battery stacks always react, some soc state deviation is generated, the main reference battery is connected with the main electrical energy storage center in parallel, the sub reference battery is connected with the sub electric energy storage center in parallel, the positive electrode and the negative electrode of the main reference battery and the positive electrode and the negative electrode of the sub reference battery are connected into the BMS subsystem, so that the soc states of the main electrical energy storage center and the sub electric energy storage center can be monitored in real time, and the soc balance is timely carried out on the main electrical energy storage center and the sub electric energy storage center according to monitored data.

Additional aspects and advantages will be apparent from the following detailed description of preferred embodiments, which proceeds with reference to the accompanying drawings.

DETAILED DESCRIPTION

Figure 1:
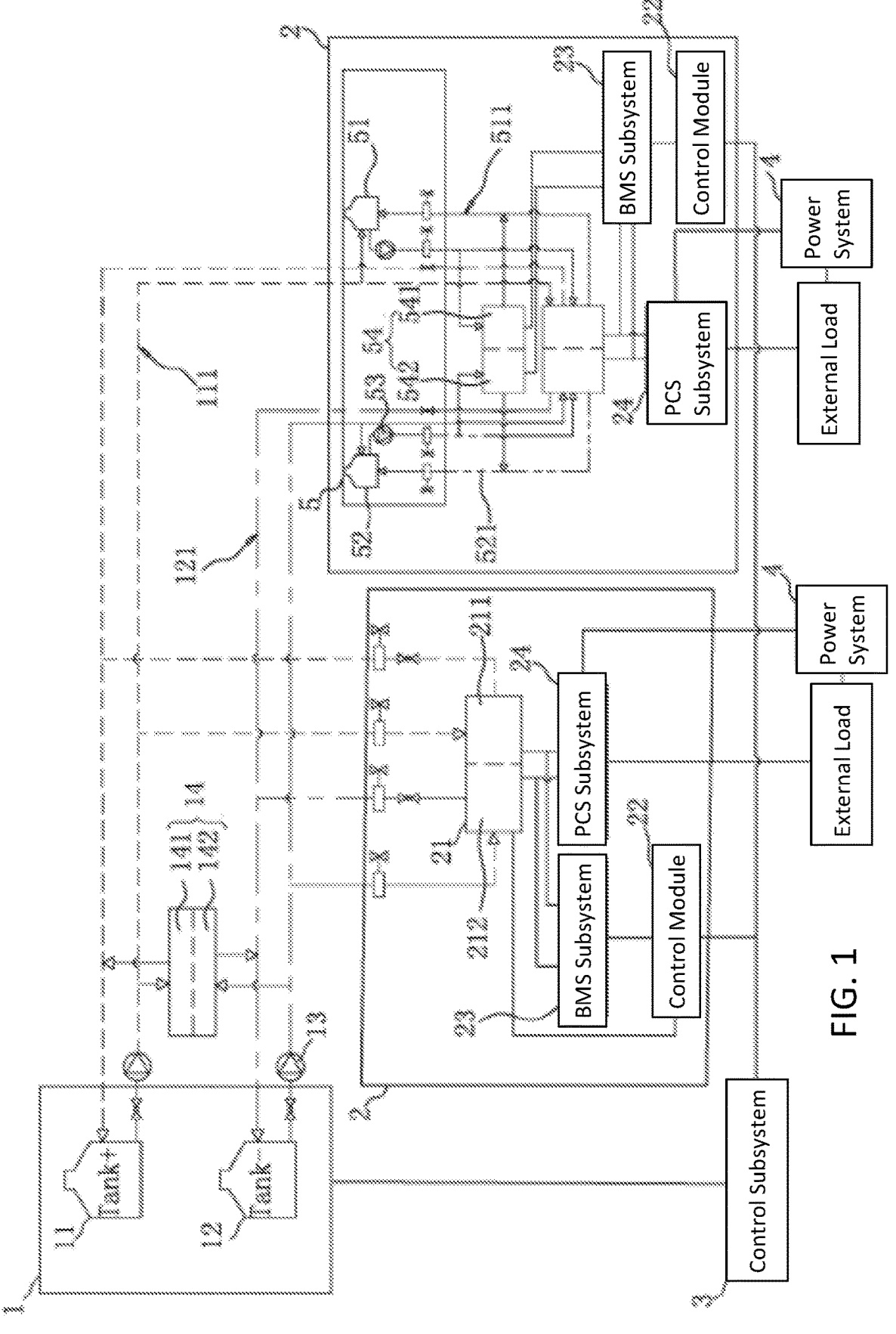
FIG. 1 is a schematic structural diagram of a distributed large-scale system embodying an all-vanadium redox flow battery in an embodiment of the present application.

In order to meet the power increase and decrease requirements of a plurality of distributed external loads or power supply systems, the application provides a distributed large-scale system of all-vanadium redox flow batteries.

The distributed large-scale system for the all-vanadium redox flow battery adopts the following technical scheme:

a distributed large-scale system of an all-vanadium redox flow battery comprises a main electrical energy storage center, a plurality of power distribution subsystems and a control subsystem;

for any power distribution subsystem, if the power of the power distribution subsystem does not meet a preset power requirement and/or the distance between the power distribution subsystem and the main electrical energy storage center exceeds a preset distance, a sub electric energy storage center connected with the main electrical energy storage center is arranged in the power distribution subsystem;

the power distribution subsystem comprises an electric energy load point and/or an electric energy access point;

the main electrical energy storage center and the plurality of power distribution subsystems are electrically connected with the control subsystem respectively.

By adopting the technical scheme, when the power distribution subsystem is far away from the main electrical energy storage center and/or does not meet the preset power requirement of the power distribution subsystem, the sub-electric energy storage center is matched with the main electrical energy storage center, the control subsystem dispatches the electrolyte of the main electrical energy storage center to the sub-electric energy storage center, so that the electrolyte of the main electrical energy storage center enters the sub-electric energy storage center, the electrolyte of the sub-electric energy storage center is balanced, and the power requirement of a plurality of external loads or power supply systems is met.

Optionally, the power distribution subsystem further includes a battery stack, a PCS subsystem and a control module, wherein an input end of the PCS subsystem is electrically connected to the battery stack, an output end of the PCS subsystem is electrically connected to the electric energy load point and/or the electric energy access point, the control module is electrically connected to the control subsystem and the battery stack, respectively, and the battery stack is connected to the main electrical energy storage center through a pipe;

when a sub electric energy storage center is arranged in the power distribution subsystem, the battery stack is also connected with the sub electric energy storage center through a pipeline;

the control module is electrically connected with the sub electrical energy storage center.

By adopting the technical scheme, the positive electrolyte and the negative electrolyte react in the battery stack to generate direct current, and the direct current is converted into alternating current through the PCS subsystem and is incorporated into a power grid so as to meet the power requirement of the power distribution subsystem; the control module can collect the direct current voltage output by the battery stack and control the flow rate of the electrolyte according to the collected direct current voltage, so that the reaction rate of the electrolyte in the battery stack is controlled, and the output power is flexibly controlled.

Optionally, the main electrical energy storage center includes a main anode electrolyte tank and a main cathode electrolyte tank; the main anode electrolyte tank and the power distribution subsystem are connected through a pipeline to form a main anode circulation pipeline, and the main cathode electrolyte tank and the power distribution subsystem are connected through a pipeline to form a main cathode circulation pipeline.

Through adopting above-mentioned technical scheme, through setting up main positive circulation pipeline and main negative pole circulation pipeline, can part anodal electrolyte and negative pole electrolyte, the two non-contact each other gets into the two poles of the earth of battery stack respectively to, can make anodal electrolyte and negative pole electrolyte recycle, reduce the wasting of resources.

Optionally, a main reference battery is connected in parallel between the main anode circulation pipeline and the main cathode circulation pipeline, the main reference battery includes a second anode reaction region and a second cathode reaction region, and the second anode reaction region is connected with the main anode electrolyte tank through a pipeline to form a circulation pipeline; and the second cathode reaction area is connected with the main cathode electrolyte tank through a pipeline to form a circulating pipeline.

By adopting the technical scheme, the main reference battery can monitor the soc state of the main electrical energy storage center in real time, and adjust the soc state in time, so that the service life of the all-vanadium redox flow battery is prolonged.

Optionally, the sub electric energy storage center includes sub positive electrode electrolyte tank and sub negative electrode electrolyte tank, sub positive electrode electrolyte tank passes through the pipe connection with main positive electrode electrolyte tank, sub negative electrode electrolyte tank with main negative electrode electrolyte tank passes through the pipe connection, sub positive electrode electrolyte tank with the battery stack passes through the pipe connection, constitutes sub positive electrode circulation pipeline, sub negative electrode electrolyte tank with the battery stack passes through the pipe connection, constitutes sub negative electrode circulation pipeline.

By adopting the technical scheme, when the main electrical energy storage center cannot meet the charging and discharging requirements of the power distribution subsystem, the sub-electric energy storage center supplements the current power distribution point so as to meet the charging and discharging requirements of the power distribution point on the all-vanadium redox flow battery.

Optionally, a sub-reference cell is connected in parallel between the sub-anode circulation pipeline and the sub-cathode circulation pipeline, the sub-reference cell comprises a third anode reaction area and a third cathode reaction area, the third anode reaction area and the sub-anode electrolyte tank are connected through a pipeline to form a circulation pipeline, and the third cathode reaction area and the sub-cathode electrolyte tank are connected through a pipeline to form a circulation pipeline.

Through adopting above-mentioned technical scheme, parallelly connected sub-reference cell between sub-positive pole circulation pipeline and sub-negative pole circulation pipeline, sub-reference cell detects sub-electric energy storage center's soc state, cooperates through control module and control subsystem, balances electrolyte, can make sub-electric energy storage center's soc state tend towards stability, and then improves all vanadium redox flow battery's life.

Optionally, the power distribution subsystem further comprises a BMS subsystem, the battery stack comprising a plurality of monolithic electric reactors; the input end of the BMS subsystem is electrically connected with the positive electrode and the negative electrode of the sub-reference battery, the output end of the battery stack and the input end of the PCS subsystem are electrically connected with the BMS subsystem, and the output end of the BMS subsystem is electrically connected with the control module.

By adopting the technical scheme, the input end of the BMS subsystem, the input end of the PCS subsystem and the positive and negative electrodes of the sub-reference battery are electrically connected, the voltage generated by each single-chip electric reactor of the battery stack and the soc state of the sub-electric energy storage center can be detected, the detection result is transmitted to the control module, a worker can monitor the internal reaction condition and the soc state of the battery stack and adjust the all-vanadium redox flow battery according to the monitoring result, so that the all-vanadium redox flow battery is in the optimal state.

Optionally, the control module is a programmable logic controller.

By adopting the technical scheme, the programmable logic controller performs simple logic calculation on the acquired data and sends the calculation result to the control subsystem, so that the control subsystem can detect the operation condition of each power distribution subsystem, and the possibility of accidents is reduced.

The present application is described in further detail below with reference to FIGS. 1-2.

The embodiment of the application discloses a distributed large-scale system of an all-vanadium redox flow battery. Referring to FIG. 1, the distributed large-scale system of the all-vanadium redox flow battery comprises a main power storage center 1, a plurality of power distribution subsystems 2 and a control subsystem 3, wherein the main power storage center 1 is respectively connected with the plurality of power distribution subsystems 2 through pipelines; the main electrical energy storage center 1 and the power distribution subsystem 2 are both electrically connected to the control subsystem 3, which may be a communication bus connection.

When the output power inside the power distribution subsystem 2 does not meet the preset power, the control subsystem 3 receives a power output shortage signal transmitted by the power distribution subsystem 2, and dispatches the electrolyte of the main electrical energy storage center 1 to enter the power distribution subsystem 2, so that the electrolyte in the power distribution subsystem 2 is increased, and the condition that the power supply of the power distribution subsystem 2 is insufficient is met.

In the process of charging the all-vanadium redox flow battery, when the electrolyte capacity in the power distribution subsystem 2 is not enough to meet the energy storage function, the electrolyte in the main electrical energy storage center 1 needs to be dispatched into the power distribution subsystem 2, the electrolyte capacity in the power distribution subsystem 2 is increased, and the storage of electric energy is supported.

In this embodiment, the main electrical energy storage center 1 may be provided near the power distribution subsystem 2 requiring the largest power to satisfy the power requirement of the power distribution subsystem 2.

The main electrical energy storage center 1 comprises a main anode electrolyte tank 11 and a main cathode electrolyte tank 12, and the capacity of the main anode electrolyte tank 11 and the capacity of the main cathode electrolyte tank 12 can be enlarged. The main anode electrolyte tank 11 is connected with the power distribution subsystems 2 through a main anode circulation pipeline 111, the main cathode electrolyte tank 12 is connected with the power distribution subsystems 2 through a main cathode circulation pipeline 121, main circulation pumps 13 are arranged on pipelines, close to the main electrical energy storage center 1, on the main anode circulation pipeline 111 and the main cathode circulation pipeline 121, and the main circulation pumps 13 convey electrolyte of the main electrical energy storage center 1 into the power distribution subsystems 2.

In addition, devices such as a temperature sensor and a liquid level sensor can be arranged in the main anode electrolyte tank 11 and the main cathode electrolyte tank 12, and both the temperature sensor and the liquid level sensor are connected with the control subsystem 3 through a network.

The temperature sensor and the liquid level sensor transmit detected data to the control subsystem 3 in real time, the control subsystem 3 compares the received data with a preset range, and when the detected temperature is lower than a preset temperature minimum value, the control subsystem 3 controls the main circulating pump 13 to increase the rotating pump speed so as to increase the reaction rate; when the detected temperature is higher than the maximum value of the preset temperature, the control subsystem 3 controls the main circulating pump 13 to reduce the pump speed and reduce the reaction rate. When the detected liquid level is lower than the preset lowest liquid level and/or higher than the preset highest liquid level, an alarm signal is sent out to remind a worker to process in time.

Figure 2:
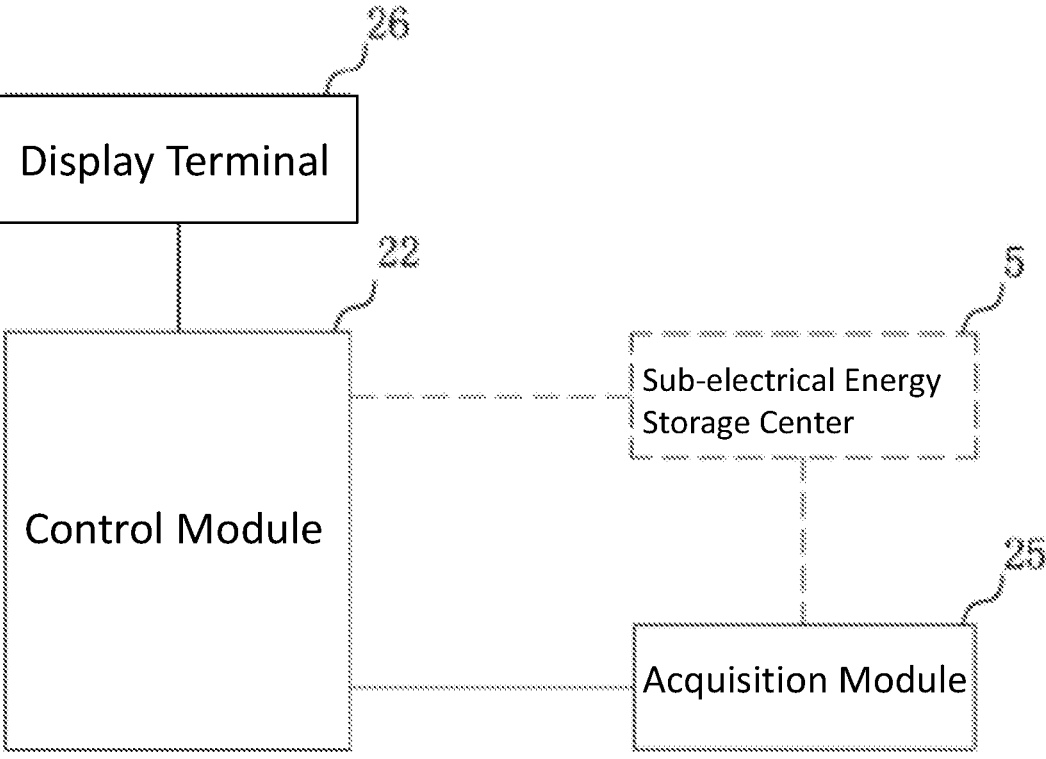
FIG. 2 is a block diagram of a power distribution subsystem embodied in an embodiment of the present application.

Referring to FIGS. 1 and 2, the power distribution subsystem 2 includes a battery stack 21, a control module 22, a BMS subsystem 23, and a PCS subsystem 24. A first anode reaction zone 211 and a first cathode reaction zone 212 are arranged in the cell stack 21, the first anode reaction zone 211 and the main anode electrolyte tank 11 are connected through a pipeline to form a main anode circulation pipeline 111, and the first cathode reaction zone 212 and the main cathode electrolyte tank 12 are connected through a pipeline to form a main cathode circulation pipeline 121.

Electromagnetic valves and manual valves are arranged on the main anode circulating pipeline 111 and the main cathode circulating pipeline 121, signal lines of the electromagnetic valves are electrically connected with the control module 22, and when the control module 22 controls the electromagnetic valves to be opened, the electrolyte flows into the power distribution subsystem 2 from the main electrical energy storage center 1 through the driving of the main circulating pump 13. Acquisition modules 25 are arranged in the first cathode reaction area 212 and the first anode reaction area 211, each acquisition module 25 comprises a pressure sensor and a temperature sensor, the pressure sensors and the temperature sensors are electrically connected with the control module 22, the control module 22 is connected with a display terminal 26, and the display terminal 26 can be a terminal such as a smart phone, a desktop computer, a tablet computer and a notebook computer.

The pressure sensor and the temperature sensor transmit the detected data to the control module 22, and the control module 22 compares the received data with preset data and transmits the comparison result to the control subsystem 3. When the temperature value acquired by the temperature sensor is lower than the preset temperature value, the control subsystem 3 controls the speed of the main circulating pump 13 to be increased, so that the reaction speed of the electrolyte is increased; when the temperature value acquired by the temperature sensor is higher than the preset temperature value, the control subsystem 3 controls the speed of the main circulating pump 13 to be reduced, and the reaction rate of the electrolyte is reduced; when the pressure value collected by the pressure sensor is higher than the preset pressure value, the control subsystem 3 controls the speed of the main circulating pump 13 to be reduced, so that the pressure applied to the battery stack 21 is reduced, and the possibility of damage to the battery stack 21 is reduced.

Further, in order to reduce the influence of the temperature of the electrolyte on the reaction rate, heat exchangers for adjusting the temperature of the electrolyte are disposed at a position where the main anode circulation pipe 111 is close to the cell stack 21 and at a position where the main cathode circulation pipe 121 is close to the cell stack 21. When the temperature of the electrolyte is too high, cold water can be added into the heat exchanger to reduce the temperature of the electrolyte, so that the reaction rate is controlled; when the temperature of the electrolyte is too low, hot water can be added into the heat exchanger to increase the temperature of the electrolyte, so that the reaction rate is controlled.

The anode and the cathode of the battery stack 21 are electrically connected with the input end of the PCS subsystem 24, and the PCS subsystem 24 can convert direct current generated by the reaction of electrolyte in the battery stack 21 into alternating current required by the power distribution subsystem 2; the output of the PCS subsystem 24 is electrically connected to an electrical energy load point for coupling ac power to an external load.

The power supply system 4 is arranged outside the distributed large-scale system of the all-vanadium redox flow battery, the PCS subsystem 24 is electrically connected with the electric energy access point, the PCS subsystem 24 is electrically connected with the electric energy load point, when the output power of the power supply system 4 is larger than the power requirement of the power distribution subsystem 2, the power supply system 4 is electrically connected with the electric energy access point, and the electric energy of the power supply system 4 is converted into direct current power through the conversion of the PCS subsystem 24 so as to store energy.

When the all-vanadium redox flow battery discharges, controlling the electric energy load point to be conducted with an external load, and outputting the external load; when the all-vanadium redox flow battery is charged, the electric energy access point is controlled to be communicated with the power supply system 4, then alternating current is converted into direct current through the PCS subsystem 24, then the direct current is input into the battery stack 21 to ionize electrolyte, and further electric energy is converted into chemical energy and stored in the main electrical energy storage center 1.

When a plurality of single-chip electric reactors are arranged in the battery stack 21, the input end of the PCS subsystem 24 is electrically connected with the input end of the BMS subsystem 23, the output end of the BMS subsystem 23 is electrically connected with the control module 22, the BMS subsystem 23 can detect the direct current output voltage of each single-chip electric reactor and transmit the detected data to the control module 22, the control module 22 transmits the received data to the control subsystem 3, and the control subsystem 3 monitors the running state of the battery stack 21 according to the detected data, so that the possibility of hidden danger in the battery stack 21 is reduced.

In this embodiment, the sub-electrical energy storage center 5 is provided for power distribution subsystems 2 where the electrolyte flow rate is significantly reduced and/or where the preset power requirements are not met. The sub-electrical energy storage center 5 comprises a sub-anode electrolyte tank 51 and a sub-cathode electrolyte tank 52, the capacity of both the sub-anode electrolyte tank 51 and the capacity of both the sub-cathode electrolyte tank 52 can be increased, and the sub-anode electrolyte tank 51 is connected with the first anode reaction area 211 through a pipeline to form a sub-anode circulation pipeline 511; the sub-anode electrolyte tank 52 is connected with the first cathode reaction zone 212 through a pipeline to form a sub-anode circulation pipeline 521. The sub-circulation pumps 53 are respectively arranged on the pipelines close to the sub-electrical energy storage center 5 on the sub-anode circulation pipeline 511 and the sub-cathode circulation pipeline 521, and the sub-circulation pumps 53 convey the electrolyte in the sub-electrical energy storage center 5 to the battery stack 21 of the power distribution subsystem 2, so that the reaction rate of the electrolyte in the battery stack 21 is accelerated, and the power requirement of the power distribution subsystem 2 is further met.

The sub-electrical energy storage center 5 is also connected with the main electrical energy storage center 1 by a pipeline, wherein the sub anode electrolyte tank 51 is connected with the main anode electrolyte tank 11 by a pipeline, and the sub cathode electrolyte tank 52 is connected with the main cathode electrolyte tank 12 by a pipeline. When the control subsystem 3 monitors that the concentration of the electrolyte in the sub-electrical energy storage center 5 is too low or too high, the electrolyte in the main electrical energy storage center 1 needs to be conveyed to the sub-electrical energy storage center 5 through the main circulating pump 13 to balance the electrolyte in the sub-electric energy storage center 5, so that the power requirement of the power distribution subsystem 2 is met.

Further, since the soc state in the electrolyte tank changes after the all vanadium redox flow battery operates for a period of time, the soc state needs to be monitored in real time. In order to monitor the soc state of the main electrical energy storage center 1 and the sub electrical energy storage center 5, it is necessary to connect the main reference cell 14 in parallel between the main electrical energy storage center 1 and the power distribution subsystem 2, and the sub reference cell 54 in parallel between the sub-electrical energy storage center 5 and the cell stack 21.

The main reference cell 14 includes a second anode reaction zone 141 and a second cathode reaction zone 142, the second anode reaction zone 141 is piped to the main positive electrolyte tank 11, the second cathode reaction zone 142 is piped to the main negative electrolyte tank 12, and the positive and negative electrodes of the main reference cell 14 are electrically connected to the BMS subsystem 23.

When the electrolyte is supplied to the power distribution subsystem 2 by the main electrical energy storage center 1, a part of the positive electrolyte and the negative electrolyte enters the main reference cell 14 to react and discharge electric energy, and then the soc state value of the main electrical energy storage center 1 is calculated by the BMS subsystem 23, and the soc state value of the main electrical energy storage center 1 is transmitted to the control subsystem 3 by the BMS subsystem 23. When the soc state value is lower, the control subsystem 3 controls the power distribution subsystems 2 to supplement the electrolyte of the main electrical energy storage center 1; when the overall soc state value of the all-vanadium redox flow battery system is too low, an alarm signal is sent out in time to remind a worker to enlarge the electrolyte capacity and adjust the soc state value.

The sub-reference cell 54 comprises a third anode reaction area 541 and a third cathode reaction area 542, the third anode reaction area 541 is connected with a sub-anode electrolyte tank 51 through a pipeline, the third cathode reaction area 542 is connected with a sub-cathode electrolyte tank 52 through a pipeline, the anode and the cathode of the sub-reference cell 54 are electrically connected with the input end of the BMS subsystem 23, the BMS subsystem 23 can collect and calculate the voltage released by the sub-reference cell 54 and transmit the monitoring data to the control module 22, and the control module 22 adjusts the rotating speed of the sub-circulation pump 53 according to the received data, so that the reaction rate of the cell stack 21 is controlled, and the power output of the all-vanadium redox flow cell is ensured.

The above embodiments are preferred embodiments of the present application, and the protection scope of the present application is not limited by the above embodiments, so: all equivalent changes made according to the structure, shape and principle of the present application shall be covered by the protection scope of the present application.

It will be obvious to those having skill in the art that many changes may be made to the details of the above-described embodiments without departing from the underlying principles of the invention. The scope of the present invention should, therefore, be determined only by the following claims.

What is claimed is:

1. An all-vanadium flow battery distributed large-scale system, comprising a main electrical energy storage center, multiple power distribution subsystems and a control subsystem;

wherein, for any one power distribution subsystem, if a power of the power distribution subsystem does not meet a preset power requirement and/or a distance between the power distribution subsystem and the main electrical energy storage center exceeds a preset distance, then a secondary electrical energy storage center connected to the main electrical energy storage center is provided in the power distribution subsystem;

wherein the power distribution subsystem comprises an electrical energy load point and/or an electrical energy connection point;

wherein the main electrical energy storage center and the multiple power distribution subsystems are each electrically connected to the control subsystem;

wherein the power distribution subsystem further comprises a battery stack, a power conversion system ("PCS") subsystem and a control module;

wherein the battery stack comprises a first anode reaction zone and a second anode reaction zone;

wherein an input end of the PCS subsystem is electrically connected to the battery stack, an output end of the PCS subsystem is electrically connected to the electrical energy load point and/or the electrical energy connection point, the control module is electrically connected to the control subsystem and the battery stack separately, and the battery stack is fluidically connected to the main electrical energy storage center;

wherein, when the secondary electrical energy storage center is provided in the power distribution subsystem, the battery stack is further fluidically connected to the secondary electrical energy storage center;

wherein the control module is electrically connected to the secondary electrical energy storage center;

wherein the power distribution subsystem further comprises a BMS subsystem, and the battery stack comprises multiple monolithic electric reactors;

wherein an output end of the battery stack and the input end of the PCS subsystem are both electrically connected to the BMS subsystem, and an output end of the BMS subsystem is electrically connected to the control module.

2. The all-vanadium flow battery distributed large-scale system as claimed in claim 1, wherein the main electrical energy storage center comprises a main positive electrode electrolyte tank and a main negative electrode electrolyte tank; the main positive electrode electrolyte tank is connected to the power distribution subsystem via a main positive electrode circulation pipeline, and the main negative electrode electrolyte tank is connected to the power distribution subsystem via a main negative electrode circulation pipeline.

3. The all-vanadium flow battery distributed large-scale system as claimed in claim 2, wherein a main reference battery is connected in parallel between the main positive electrode circulation pipeline and the main negative electrode circulation pipeline, the main reference battery comprises a second anode reaction zone and a second cathode reaction zone, the second anode reaction zone is connected to the main positive electrode electrolyte tank via the main positive electrode circulation pipeline, and the second cathode reaction zone is connected to the main negative electrode electrolyte tank via the main negative electrode circulation pipeline.

4. The all-vanadium flow battery distributed large-scale system as claimed in claim 2, wherein the secondary electrical energy storage center comprises a secondary positive electrode electrolyte tank and a secondary negative electrode electrolyte tank, the secondary positive electrode electrolyte tank is connected to the main positive electrode electrolyte tank via the main positive electrode circulation pipeline, the secondary negative electrode electrolyte tank is connected to the main negative electrode electrolyte tank via the main negative electrode circulation pipeline, the secondary positive electrode electrolyte tank is connected to the battery stack via a secondary positive electrode circulation pipeline, and the secondary negative electrode electrolyte tank is connected to the battery stack via a secondary negative electrode circulation pipeline.

5. The all-vanadium flow battery distributed large-scale system as claimed in claim 4, wherein a secondary reference battery is connected in parallel between the secondary positive electrode circulation pipeline and secondary negative electrode circulation pipeline, the secondary reference battery comprises a third anode reaction zone and a third cathode reaction zone, the third anode reaction zone is connected to the secondary positive electrode electrolyte tank via the secondary positive electrode circulation pipeline, and the third cathode reaction zone is connected to the secondary negative electrode electrolyte tank via the secondary negative electrode circulation pipeline.

6. The all-vanadium flow battery distributed large-scale system as claimed in claim 1, wherein an input end of the BMS subsystem is electrically connected to positive and negative electrodes of a secondary reference battery.

7. The all-vanadium flow battery distributed large-scale system as claimed in claim 1, wherein the control module is a programmable logic controller.

8. An all-vanadium flow battery distributed large-scale system, comprising a main electrical energy storage center, multiple power distribution subsystems and a control subsystem;

wherein, for any one power distribution subsystem, if a power of the power distribution subsystem does not meet a preset power requirement and/or a distance between the power distribution subsystem and the main electrical energy storage center exceeds a preset distance, then a secondary electrical energy storage center connected to the main electrical energy storage center is provided in the power distribution subsystem;

wherein the power distribution subsystem comprises an electrical energy load point and/or an electrical energy connection point;

wherein the main electrical energy storage center and the multiple power distribution subsystems are each electrically connected to the control subsystem;

wherein the power distribution subsystem further comprises a battery stack, a power conversion system ("PCS") subsystem and a control module;

wherein the battery stack comprises a first anode reaction zone and a second anode reaction zone;

wherein an input end of the PCS subsystem is electrically connected to the battery stack, an output end of the PCS subsystem is electrically connected to the electrical energy load point and/or the electrical energy connection point, the control module is electrically connected to the control subsystem and the battery stack separately, and the battery stack is fluidically connected to the main electrical energy storage center;

wherein, when the secondary electrical energy storage center is provided in the power distribution subsystem, the battery stack is further fluidically connected to the secondary electrical energy storage center;

wherein the control module is electrically connected to the secondary electrical energy storage center;

wherein the main electrical energy storage center comprises a main positive electrode electrolyte tank and a main negative electrode electrolyte tank;

wherein the main positive electrode electrolyte tank is connected to the power distribution subsystem via a main positive electrode circulation pipeline, and the main negative electrode electrolyte tank is connected to the power distribution subsystem via a main negative electrode circulation pipeline; and wherein a main reference battery is connected in parallel between the main positive electrode circulation pipeline and the main negative electrode circulation pipeline, the main reference battery comprises a second anode reaction zone and a second cathode reaction zone, the second anode reaction zone is connected to the main positive electrode electrolyte tank via the main positive electrode circulation pipeline, and the second cathode reaction zone is connected to the main negative electrode electrolyte tank via the main negative electrode circulation pipeline.

9. An all-vanadium flow battery distributed large-scale system, comprising a main electrical energy storage center, multiple power distribution subsystems and a control subsystem;

wherein, for any one power distribution subsystem, if a power of the power distribution subsystem does not meet a preset power requirement and/or a distance between the power distribution subsystem and the main electrical energy storage center exceeds a preset distance, then a secondary electrical energy storage center connected to the main electrical energy storage center is provided in the power distribution subsystem;

wherein the power distribution subsystem comprises an electrical energy load point and/or an electrical energy connection point;

wherein the main electrical energy storage center and the multiple power distribution subsystems are each electrically connected to the control subsystem;

wherein the power distribution subsystem further comprises a battery stack, a power conversion system ("PCS") subsystem and a control module;

wherein an input end of the PCS subsystem is electrically connected to the battery stack, an output end of the PCS subsystem is electrically connected to the electrical energy load point and/or the electrical energy connection point, the control module is electrically connected to the control subsystem and the battery stack separately, and the battery stack is fluidically connected to the main electrical energy storage center;

wherein, when the secondary electrical energy storage center is provided in the power distribution subsystem, the battery stack is further fluidically connected to the secondary electrical energy storage center;

wherein the control module is electrically connected to the secondary electrical energy storage center;

wherein the main electrical energy storage center comprises a main positive electrode electrolyte tank and a main negative electrode electrolyte tank;

wherein the main positive electrode electrolyte tank is connected to the power distribution subsystem via a main positive electrode circulation pipeline, and the main negative electrode electrolyte tank is connected to the power distribution subsystem via a main negative electrode circulation pipeline; and wherein the secondary electrical energy storage center comprises a secondary positive electrode electrolyte tank and a secondary negative electrode electrolyte tank, the secondary positive electrode electrolyte tank is connected to the main positive electrode electrolyte tank via the main positive electrode circulation pipeline, the secondary negative electrode electrolyte tank is connected to the main negative electrode electrolyte tank via the main negative electrode circulation pipeline, the secondary positive electrode electrolyte tank is connected to the battery stack via a secondary positive electrode circulation pipeline, and the secondary negative electrode electrolyte tank is connected to the battery stack via a secondary negative electrode circulation pipeline.

* * * * *